Oct. 1, 1963  J. W. BROWN, JR  3,105,544
RECUPERATOR
Filed Feb. 8, 1960  4 Sheets-Sheet 2

INVENTOR.
JOHN B. BROWN, JR.
BY
Bosworth, Sessions,
Herzstrom & Knowles
ATTORNEYS

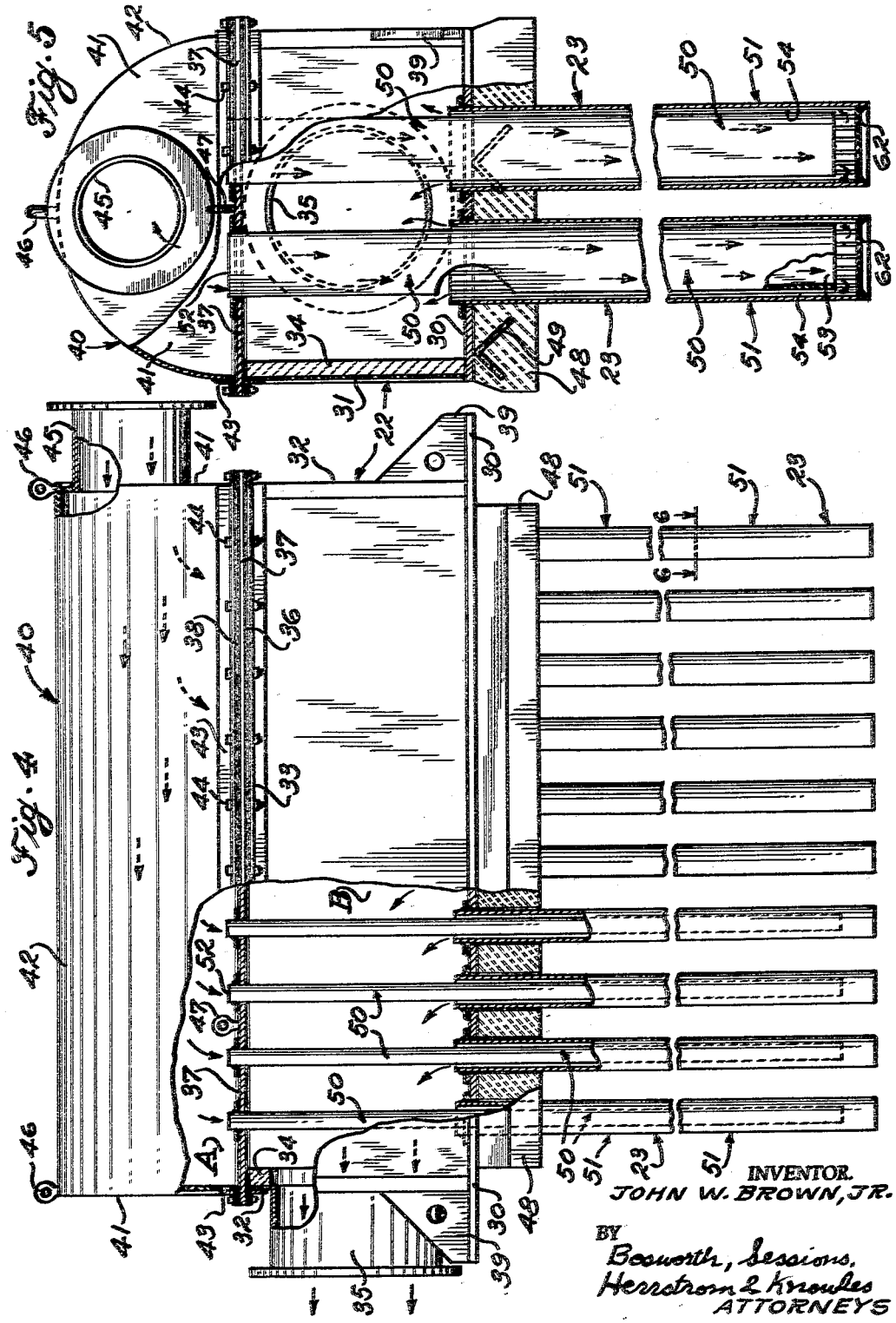

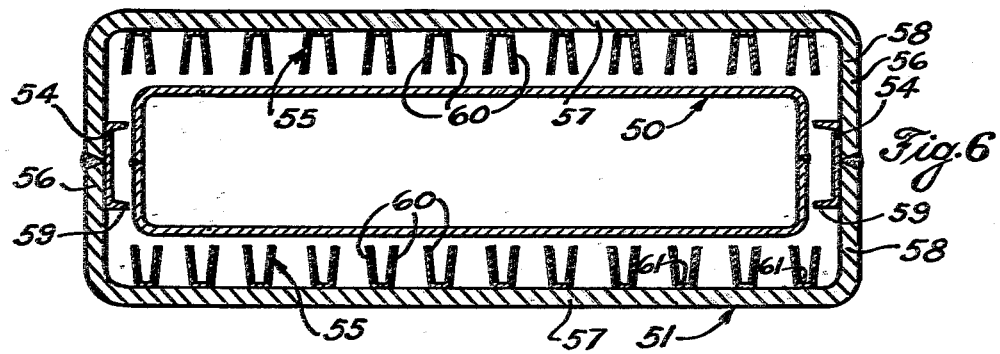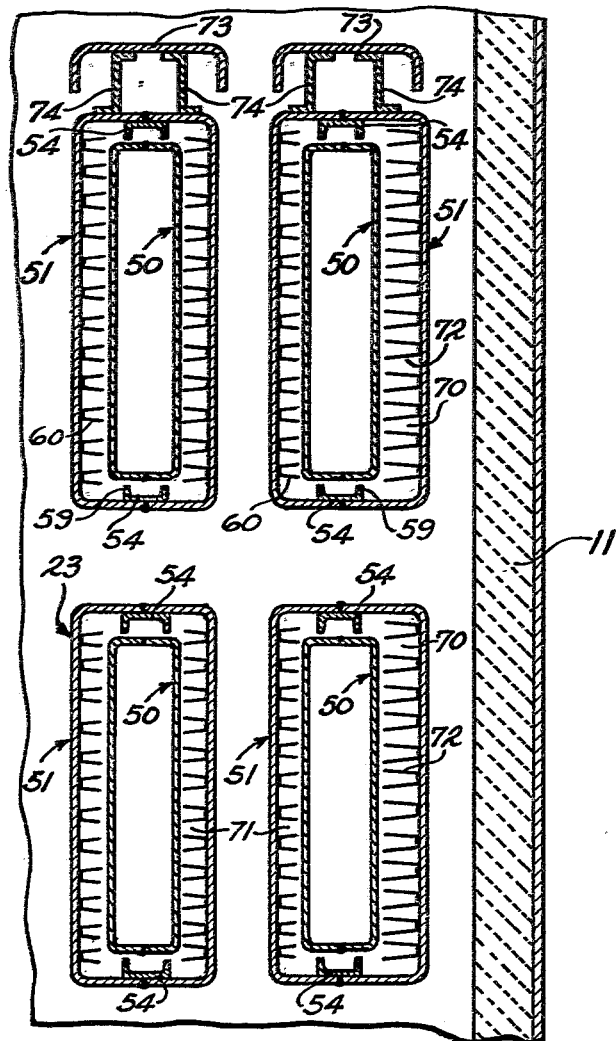

United States Patent Office 3,105,544
Patented Oct. 1, 1963

3,105,544
RECUPERATOR
John W. Brown, Jr., Lakewood, Ohio, assignor to Brown Fintube Company, Elyria, Ohio, a corporation of Ohio
Filed Feb. 8, 1960, Ser. No. 7,440
2 Claims. (Cl. 165—142)

This invention relates to heat exchangers, and more particularly to recuperators in which hot waste gases such as hot products of combustion or flue gases are used to preheat air or fluid fuel to be used in combustion.

For the purpose of convenience, the invention will be discussed in connection with recuperators used in heating furnaces in the steel industry, in which flue gas is used to preheat combustion air for the furnace, although it will be apparent that the invention may have other uses and provide advantages in other fields.

In steel industry heating furnaces, it is necessary to burn substantial amounts of fuel wiht large volumes of air in order to achieve the high temperatures and large quantities of heat required for steel heating operations; this results in large volumes of waste or flue gases, having high temperatures and heat contents remaining after the primary heating use. These factors have long made it advantageous to use recuperators or regenerators to recover some of the heat of the waste gas by using the hot flue gas to preheat the combustion air and thus increase the heat output of the furnace for a given amount of fuel consumption.

Until quite recently the relative low heat exchange efficiencies of prior recuperators were tolerable, since the economic losses resulting from such inefficiency were not excessively burdensome. However, in recent years the greatly increased costs of fuel, labor and capital equipment and the attendant necessity for close cost control in all steel making operations, have made it important to recover as much heat as possible from flue gases and transfer it to the incoming combustion air in order to increase the heating efficiency and thus the output of the furnace to as great an extent as possible. It is also important that shut-down of furnaces for maintenance, such as for repair or replacement of recuperators, be reduced to a minimum. While new furnace installations are designed and built with these factors in mind, great efforts are also being made to increase the efficiencies and outputs of existing furnaces because of the high costs of new furnaces and long times required to build and put them into operation; and increased recovery of otherwise wasted heat in flue gases is one of the most effective and economical approaches toward achieving increases in efficiency and output of old furnaces.

In prior recuperators of the general type to which this invention pertains, i.e., metallic recuperators having bayonet-type heat exchange elements, the amount of heat exchange per heat exchange element or bank of such elements has been relatively low; therefore in such prior recuperators large numbers of such bayonet-type heat exchange elements have been required even to approach the amount of combustion air preheating desired. Prior recuperators, therefore, having required large amounts of space and have offered substantial resistance to the flow of flue gases. For these reasons, the use of prior recuperators usually has involved considerably higher costs than desired.

It has also often been difficult if not impossible greatly to increase the outputs of older existing furnaces by using prior recuperators due to lack of space in which to dispose the large number of heat exchange elements required in prior recuperators, and due to difficulties and expense involved in overcoming the draft problem caused by such large numbers of heat exchange elements.

In general, in prior recuperators the inner and outer tubes of each bayonet type heat exchanger element are of circular cross-section, and define between them an annular space which is clear except for a few widely spaced lugs intended to separate the tubes. The outer tubes are disposed in the path of the hot flue gases. The recuperator is designed so that air to be heated flows downwardly through the inner, or bayonet tube which has an open lower end and upwardly through the annular space between the inner and outer tubes. The air is heated by transfer of heat through the outer tube from the hot flue gas outside such tube. In recuperators having such heat exchange elements, distortions often occur which cause failure, particularly at the higher temperatures which it is desired to employ in recent practice, and despite use of costly heat resistant alloys as tube materials.

One major type of such distortion occurs when the portion of the arcuate surface of the outer tube facing the hot flue gases, which may be defined as the front portion of the tube, flattens under the influence of the heat, apparently due to unequal expansion of the metal. When this occurs, there is a corresponding decrease in the width of the annular space between the inner and outer tubes in this area, thus restricting the amount of air which can flow in the hottest portion of the periphery of the heat exchange element. This further reduction of air flow tends to cause an additional increase in heating of the portions of the outer tube facing the heating gas, which causes additional flattening of the outer tube and further restriction of the air flow between the inner and outer tubes, and so on, frequently continuing until there is tube failure. In another major type of distortion, the outer tube as a whole tends to curve or bow so its free end is displaced in the direction of flow of the hot flue gases, apparently due to greater expansion of the portion of the surface of the tube facing the hot gases than of other portions of the tube. Such distortion also can result in restriction of air flow in the hottest portion of the tube, contacting of the tubes to cause a "hot spot," and failure of the heat exchange element. Usually, both these major types of distortions occur together, and other types may occur. Such distortions, which cannot be prevented even by the spacing lugs usually employed in the prior devices, cause failure of the prior heat exchange elements, or require frequent preventative inspection or repair, resulting in costly shut-downs and loss of production.

A general object of this invention is to provide a recuperator having bayonet type heat exchange elements providing greatly increased heat transfer capacity as compared to prior recuperators of the such type, whereby the efficiency of heat exchange may be greatly increased without large additional increases in space, draft requirements or costs. Another general object of this invention to provide such a recuperator in which a bank of heat exchange elements may have several times, even three to eight times, as much heat transfer surface exposed to the air to be heated as a bank of heat exchange elements in a prior recuperator occupying the same space.

Another object of the present invention is to provide such a recuperator which resists distortion of the tubes and heat exchange elements and hence provides longer life and the capability of being used at higher temperatures than prior recuperators. A further object is to provide a recuperator which may be used to great advantage in existing furnaces to increase heat recovery and furnace output; the greatly increased heat transfer capacity, compactness, and minimization of draft problems of devices embodying the present invention are all of particular importance in these applications.

Another object of this invention is to provide a recuperator having bayonet-type heat exchange elements which are of generally rectangular cross section and are disposed with the major axis of the rectangle extending in the direction of flow of the heating gases, and in which the outer tubular element has on its interior surfaces heat transfer fins which greatly increase the heat exchange capacity of each heat exchanger element and strengthen and reinforce the heat exchange elements against distortion. It is another object of this invention to provide such a recuperator in which such rectangular heat exchange elements are disposed in rows with corresponding heat exchange elements in adjacent rows in aligned relation. It is a further object to provide a recuperator with bayonet-type heat exchange elements of rectangular cross section in which the ends of such heat exchange elements facing the direction of the flow of the hot flue gases in at least the first row of a bank, are shielded against such gases. It is another object of the invention to provide such a recuperator in which the heat exchange elements nearest the side walls of the chamber through which flow the hot flue gases, have wider air passages between the inner and outer tubes together with wider fins therein on at least the side of the heat exchange element adjacent said chamber wall, to reduce temperatures on the element surfaces which might otherwise be damaged by radiation of heat from such walls.

It is another object of this invention to provide recuperator units embodying some or all of the features which may be manufactured at low costs, be readily installed in connection with new or old furnaces, and which may easily be removed for inspection, replacement or repair.

Further objects and advantages of my invention will become apparent from the following description of preferred forms thereof, reference being made to the accompanying drawings in which:

FIGURE 4 is a side elevation to an enlarged scale, in general a view from line 4—4 of FIGURE 1, of a recuperator unit constituting a preferred embodiment of my invention, parts being broken away to show details of construction thereof;

FIGURE 5 is an end elevation of the recuperator unit of FIGURE 4 and to the same scale, parts being broken away to show details of construction thereof;

FIGURE 6 is a cross section of one of the heat exchange elements of the recuperator of FIGURE 4, along line 6—6 of FIGURE 4, but to an enlarged scale;

FIGURE 7 is a detail to a still larger scale of a portion of a heat exchange element showing a preferred form of fin member;

FIGURE 8 is a detail, to an enlarged scale, showing several modified heat exchange elements of the recuperator unit of the type shown in FIGURES 4 and 5.

Figure 1:
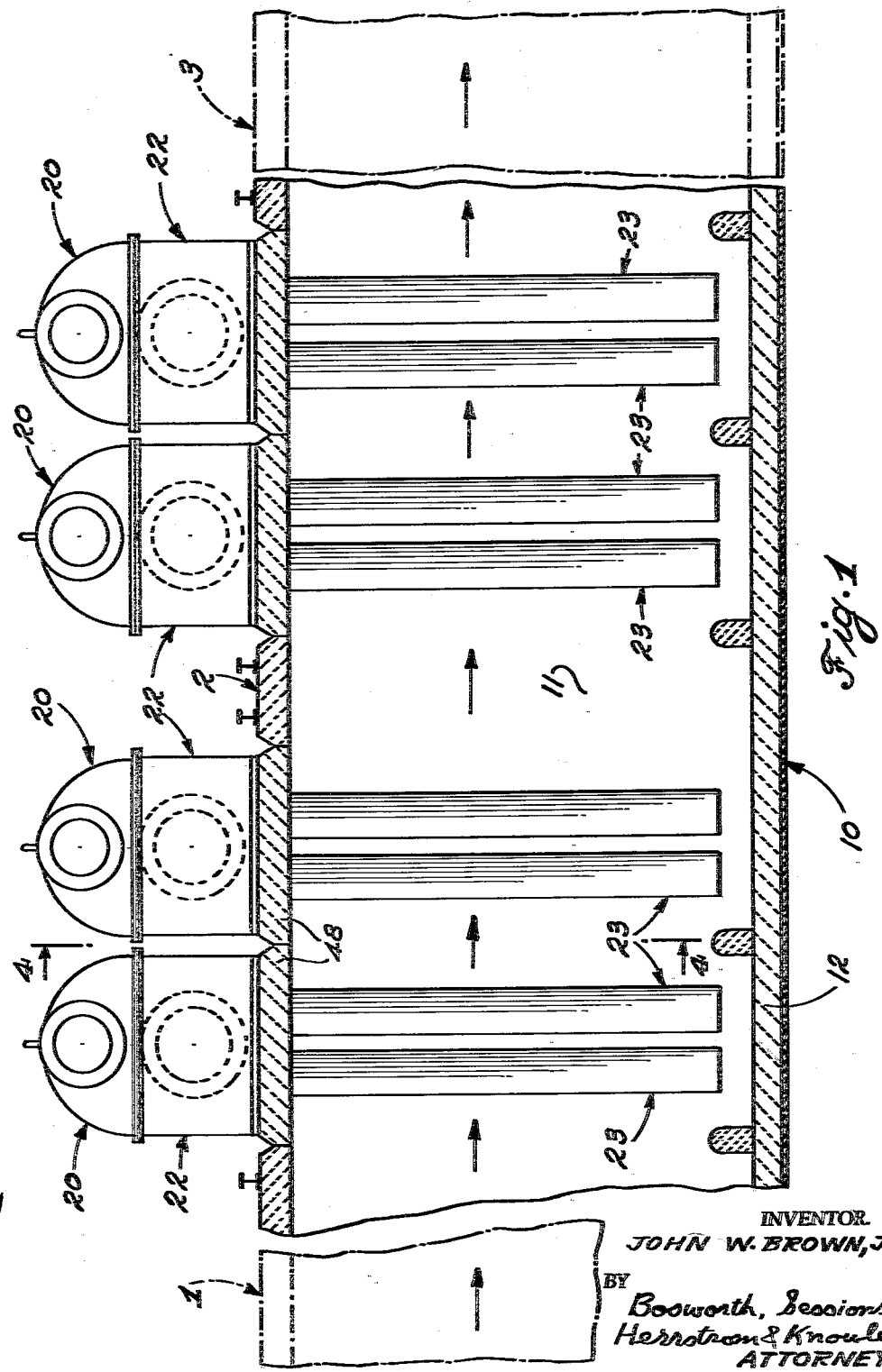
FIGURE 1 is a side elevation of a portion of one form of recuperator embodying my invention, showing recuperator units in place in said recuperator, and in dotted lines a portion of the furnace from which the waste flue gases emanate and a portion of the stack to which such gases proceed.
Figure 2:
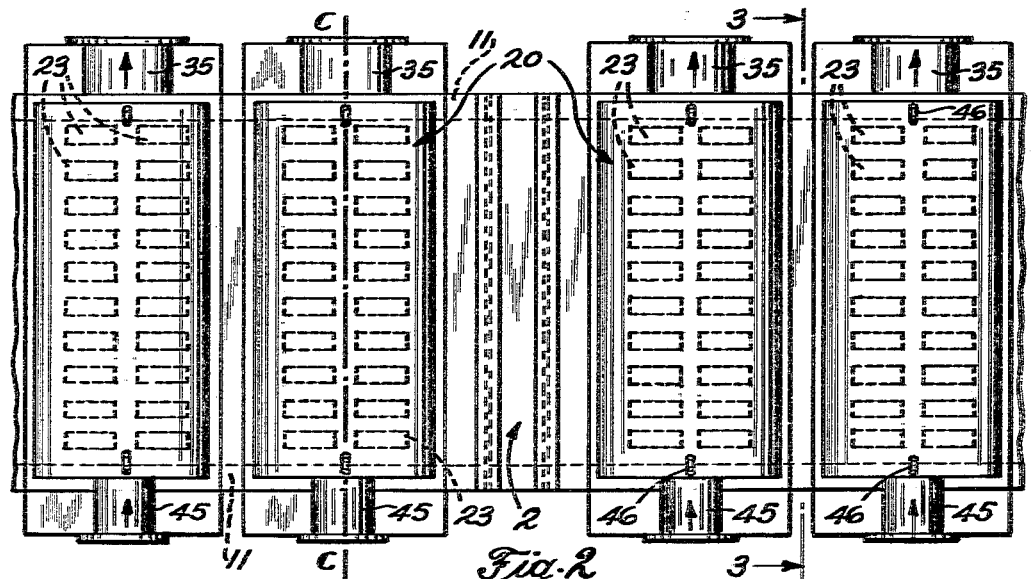
FIGURE 2 is a plan view of the recuperator of FIGURE 1, and to the same scale.
Figure 3:
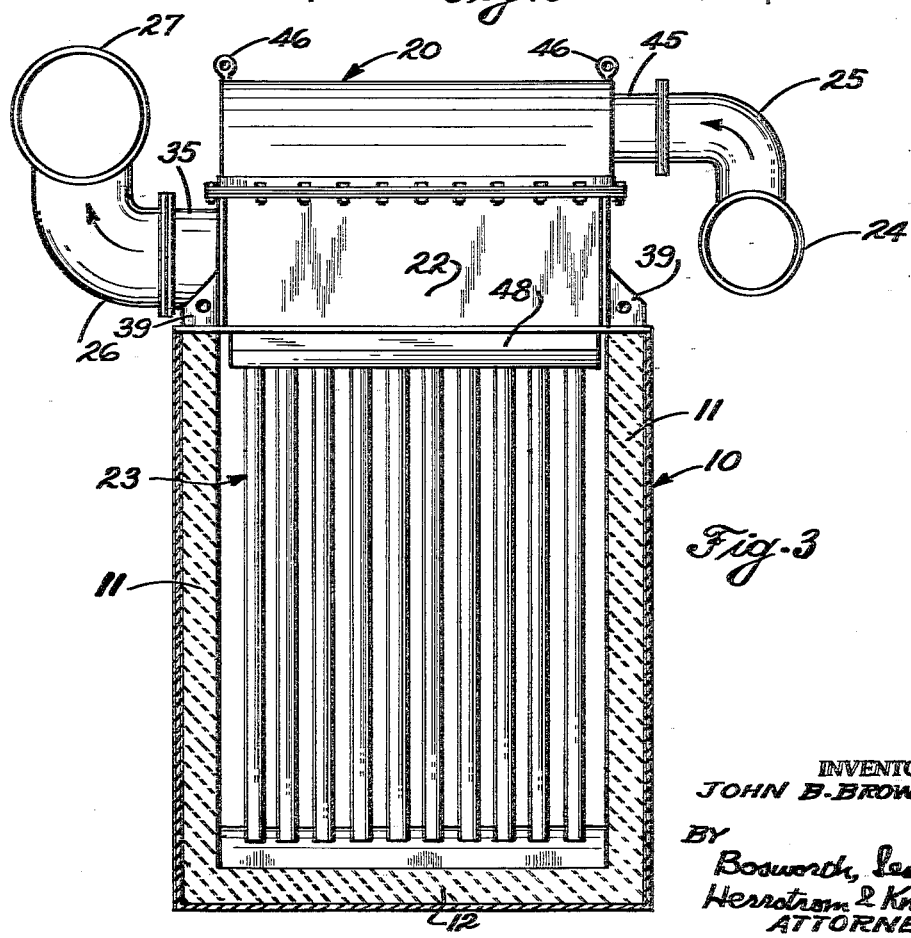
FIGURE 3 is a vertical sectional elevation, taken along line 3—3 of FIGURE 2, to the same scale as FIGURE 1.

FIGURES 1, 2 and 3 show a recuperator embodying a preferred form of the invention in which flue gasses emanating from a steel industry heating furnace indicated by numeral 1 pass through a recuperator generally designated by numeral 2 to a stack manifold 3. The recuperator includes a longitudinally extending chamber 10 comprising side walls 11 and bottom wall 12 formed of refractory material encased in steel to provide strength and prevent the escape of flue gases from the interior of the recuperator. As indicated, the flue gases flow longitudinally through the chamber, in the direction indicated by the arrows, from the furnace to the stack manifold.

The recuperator also comprises a plurality of recuperator units 20 supported at the tops of the side walls 11 of the recuperator chamber. Each of these units, which will be described in detail later, comprises an upper portion 22 having upper and lower compartments and supporting two parallel rows of heat exchanger elements 23.

Unheated air, impelled by a fan or blower is supplied through a conduit 24 extending longitudinally of the recuperator and communicating by means of ducts 25 with the upper compartment of each of the upper portions 22 of the recuperator unit. In a manner to be described later, the unheated air passes from said upper compartment into each of the heat exchange elements 23, and is circulated downwardly and upwardly through each such heat exchange element 23 to a lower compartment forming part of the upper portion 22 of the recuperator unit 2, the air being heated in such passage. The heated air passes out of the upper portion 22 of each of the recuperator units 20 through a duct 26 to a conduit 27 extending longitudinally of the recuperator unit. The hot air then passes to the burners of the furnace where it is used in combustion and thus increases the heat output of the furnace.

As illustrated in FIGURES 4 and 5, the upper portion 22 of the unit 20 comprises a lower partition or base plate 30 to which are fixed sheet metal side and end walls 31 and 32 terminating at their upper edges in a flange 33. The side and end walls are lined with suitable heat resistant material 34; one end wall has a flanged duct 35 constituting an air outlet and adapted to be connected to the duct 26 communicating with the heated air conduit 27 as shown in FIGURES 2 and 3.

In order to divide the upper portion 22 into an inlet chamber and an outlet chamber, an intermediate partition 37 is supported on the flange 33 at the top of the side and end walls. The connection between the flange 33 and the partition is sealed by a gasket 36. A housing, generally designated by reference numeral 40, is formed of end walls 41 fixed to a curved top 42, the lower edges of the end walls 41 and top 42 being formed with a flange 43 which is supported by the partition 37 through sealing gasket 38. Bolts 44 serve to fasten flanges 33, 43 sealing gaskets 36 and 38, and the edges of partition 37 together to form a rigid, air-tight structure. Housing 40 is provided with a flanged duct 45, shown as located at the end of housing 40 opposite the end of the structure at which duct 35 is located; duct 45 constitutes the cold air inlet, and is adapted to be connected to the duct 25 connected to the cold air conduit 24 as shown in FIGURES 2 and 3.

The upper portion 22 of the recuperator unit 20 so far described thus defines an upper compartment A with which the air inlet duct 45 communicates, superposed over a lower compartment B opening into an air outlet duct 35. This upper portion 22 as a whole also forms a supporting member for the heat exchange elements 23.

This upper portion of the recuperator unit is provided with apertured brackets 39 fixed to base plate 30 at each end thereof, serving as means whereby the unit as a whole may be conveniently lifted for installation or removal; rings 46 fixed to housing 40 whereby it may be readily lifted on or off partition 37, and rings 47 on partition 37 whereby the partition and its associated tubular elements, to be described later, may be lifted off the lower structure.

Base plate 30 is preferably provided with a layer 48 of heat insulating material which protects the structure from the heat of the flue gases passing through the recuperator chamber 10, as shown in FIGURES 1, 2 and 3. The layer may be supported by brackets 49 fixed to the bottom of plate 30 and embedded in the insulating material.

As shown in detail in FIGURES 4, 5, 6, and 7, in the illustrated embodiment of the invention each heat exchange element 23 comprises an inner tubular element 50 and, surrounding it, an outer tubular element 51, both being of rectangular cross section and mounted with the major axis of the rectangular cross section extending transversely of the upper portion 22 of the unit.

Inner tubular element 50 is shown as having openings 52 and 53, respectively, at its upper and lower ends. Its upper end is fixed to partition 37, as by a welded joint as shown, so that the element is suspended from the partition 37 and communicates with the upper chamber A which provides the air supply. Inner tubular element 50 is conveniently made by welding together two channel sectioned members, to define the rectangular cross-sectioned tubular element desired, as shown in FIGURE 6.

The outer tubular element 51 has an open upper end and has its lower end closed by a welded plate 62. Its upper end is fixed to and suspended from the base plate 30, as by the welded joint shown. Outer tubular element 51 thus communicates with the lower chamber B of the upper portion 22 of the unit, which thus constitutes the air discharge receptacle for the heat exchange elements of the unit. In operation, relatively cool air is blown into the chamber A, passes downwardly through the inner tubular elements 50 and upwardly between the inner and outer tubular elements 50 and 51 into the lower chamber B, from which the heated air is discharged through duct 35.

In order to increase the heat exchange capacity of the unit and to prevent the outer element 51 from being overheated and distorted, the outer tubular element 51 is provided with a plurality of spaced heat transfer fin members 54 and 55 fixed to the inner surfaces of its end walls 56 and side walls 57. As shown, more particularly in FIGURE 6, the outer tubular element 51 preferably is formed of two channel members 58, preferably of heavier gauge metal than the inner tubular element 50, which are welded together at their longitudinal edges, the weld joint extending longitudinally at the center of each end wall 56. The fin member 54, which is welded inside the outer tubular element 51 at the weld joint, acts as a backing strip, in the welding operation to provide a sound, tight joint. Member 54 is of channel section; its projecting edges form a plurality of heat transfer fins 59 fixed to the inner surface of each end wall of the element 51. These fins 59 are so proportioned that they extend into close proximity to the outer surface of inner tubular element 50 at each end wall.

As is also shown in FIGURES 6 and 7, the fin members 55 are in the form of channel sections, each fin member having a pair of fin portions 60 joined to a base portion 61. The fin members are welded to the interior surface of each channel 58 before it is assembled with another such channel to form a tubular element 51, for example, in accordance with the method and apparatus disclosed in Patent No. 2,473,668 issued June 21, 1949. The fin portions 60 are so proportioned that they extend into close proximity with the exterior surfaces of the sides of the inner tubular members 50.

In the illustrated embodiment of the invention, each recuperator unit comprises two rows of heat exchange elements 23, the corresponding heat exchange elements in the rows being disposed in aligned relation with their major axes of their rectangular cross sections extending at right angles to the axis C of the longitudinally extending upper portion 22 which constitutes the supporting member for the heat exchange elements. This arrangement of such elements is preferable for many uses. The recuperator units are mounted at the top of recuperator chamber 10 with the heat exchange elements thereof projecting downwardly into the chamber 10. The rows of heat exchange elements extend across the chamber and transversely of the direction of flow of the flue gases, with the major axis of the cross section of each heat exchange element substantially parallel to the flow of flue gas.

In operation, unheated air passes from conduit 24, through duct 25, into the upper compartment A of the upper portion 22 of each unit. The air passes downwardly through each inner tubular element 50, out of the bottom of tubular element 50 and upwardly through the peripheral space between the inner tubular element 50 and outer tubular element 51, into the lower compartment B, from which the heated air is discharged through duct 26 into conduit 27, from whence it passes to the burners of the furnace.

As the air passes upwardly through the peripheral space between the inner and outer tubular elements, it is heated rapidly by transfer of heat from the outer surfaces of the side and end walls of the rectangular outer tubular element of each heat exchange element, through the walls and the fins 59 and 60 on the internal surfaces thereof. Heat is transferred both by convection and radiation, the fins and their great heat transfer surfaces particularly providing a high rate of heat exchange. Because of the large internal heat transfer surface provided by the fins, the air abstracts heat from the outer tubular element at a rate much greater than is possible with the ordinary prior tubular member without fins. As a result, the outer tubular elements 51 are maintained at a much cooler temperature with respect to the flue gases than is possible with unfinned tubes. This lower temperature and the resulting higher temperature differential between the outer tubular element and the hot flue gas substantially increases the rate of heat exchange between the flue gases and the elements 51; the lower temperatures of the heat exchanger elements also reduce damaging effects of heat upon such elements. The air passing downwardly through the inner tube also is preheated to a substantial degree by heat from the walls of inner tubular element 50, the walls being heated largely as a result of radiation from the outer tubular element 51.

The rectangular cross section of the heat exchange elements provided by the present invention also aids greatly in providing increased heat transfer. The cross section of itself gives a greater heat transfer surface area of tube walls in relation to the volume of air space than does a circular cross section heat exchange element, because a rectangle has a longer periphery for a given closed area than a circle of the same area. In addition, in a given length of row and without exceeding a given permissible total frontal area of heat exchange elements across the flue gas chamber 10, it is possible to dispose more heat exchange elements of rectangular cross-section embodying the present invention than prior heat exchange elements of circular cross section, with a substantial increase in heat exchange capacity for this additional reason.

For the above reasons, with a recuperator or recuperator unit comprising a bank of internally-finned heat exchange elements of rectangular cross-section in accordance with the present invention, it is possible to achieve from three to eight or more times as much heat transfer capacity as with prior recuperators having a bank of heat exchange elements of circular cross section occupying the same amount of space and having the same frontal area.

Moreover, the strength and durability of the outer tubular element 51 are greatly increased by the fins 60 on the side walls of outer tubular element 51, particularly when they are embodied in the channel-shaped fin members 55 and extend into close proximity to the side walls of inner tubular element 50 as illustrated, and by the fins 59 on the end walls of said outer tubular element, particularly when they are embodied in channel-shaped fin members 54 and extend into close proximity to the end walls of tubular member 50 as illustrated. This added strength not only aids in resisting stresses due to pressure differentials between the gases inside and outside of the heat exchange element, but also greatly increases the resistance of the outer tubular element against distortion of either of the types indicated above as often occurring in prior circular tube types of recuperators, or of other types of distortion which could cause failure. Even if any bowing or other deformation due to heat should occur in either the outer or inner tubular elements of a heat exchange element, the fins on the inner surface of the outer tubular element prevent any substantial reduction of the air space between the tubular elements. Consequently, "hot spots" or other causes of failure arising from reduced air flow or contact of the inner and outer tubular elements are prevented. The life and durability of the heat exchange elements, and hence of recuperators and recuperator units embodying the invention, are therefore greatly increased.

Additional durability is provided if either or both features illustrated in FIGURE 8, and forming parts of this invention, are used. FIGURE 8 shows a portion of a bank of heat exchange elements 23 embodying the present invention, located near one of the side walls 11 of the recuperator chamber, and having one row of such elements fully exposed to the hot flue gases flowing in the direction of the arrow, as occurs in the first row of the first bank of heat exchange elements in a recuperator.

The heat exchange elements at the extreme end of each row, i.e., those nearest the recuperator chamber side walls 11, are exposed to substantially more heat than other elements, due to heat radiated from the side walls 11. In each of the extreme end heat exchange elements shown in FIGURE 8, the inner and outer tubular elements 50 and 51 are so proportioned and positioned relative to each other that the side wall of outer tubular member 51 at the extreme end of the row and nearest wall 11 of the recuperator chamber is spaced from the associated side wall of the inner tubular member 50 by a width 70 substantially greater than the width 71 between the sides of the inner and outer tubular members 50 and 51 in other heat exchange elements in the row. The fins 72 on the interior surface of said side wall are also substantially wider than corresponding fins in other heat exchange elements in the row. Where desirable such space 70 and the fins 72 therein can be as much as 50% wider than other spaces and fins in the row of heat exchange elements. This increased width permits a greater flow of air through space 70, and greater rate of heat transfer from the wider fins, so as to keep this end heat exchange element, and particularly the extreme outer side thereof, at a lower temperature than would otherwise be the case, and at approximately the same temperature as the inner side of the element. This increases the life of the element and also reduces the thermal strains that tend to bow the element.

The surfaces of the heat exchange elements first exposed to the hot flue gases in a bank or series of banks of heat exchange elements undergo the most severe heat and erosion conditions. According to the present invention, and as shown in FIGURE 8, each heat exchange element in such a position may have mounted thereon a shield 73 carried by brackets 74. Shield 73 is preferably formed of material, such as a chromium alloy or ceramic covered metal having exceptionally good heat resistance, and shaped to protect the leading end of the heat exchange element from the direct blast of hot gases which would otherwise impinge on it and tend to cause deterioration. The protection provided by such a shield, together with the protection against heat emanating from the recuperator chamber wall as provided by wider fins and air space at the end of the rows as described above, these protective features being located at points where heat damage tendencies are greatest, in cooperation with the cooling and the resistance to deformation provided by the internal fins as described above, all result in an extremely durable recuperator and recuperator unit, having a longer life than prior recuperators, and capable of operating at higher temperatures.

Obviously, either or both the features shown in FIGURE 8 may be employed in the recuperator shown in FIGURES 1 to 3 inclusive, or in the recuperator unit shown in FIGURES 4 and 5.

The present invention therefore provides recuperators and recuperator units, of the bayonet tube type, which have much greater heat exchange capacities, and greater durability than prior recuperators or units of this type. As is indicated by the drawings, recuperators of the invention have heat exchange elements in which at least one tubular element carries, in the peripheral space between the tubular elements, longitudinally extending fins which are so closely spaced and of such number that such tubular element provides in the peripheral space a heat transfer area at least twice as great as the heat transfer area of the bare outer surface of the outer tubular element. By using recuperators embodying the invention, it is possible to achieve higher temperatures of the heated air and greater efficiencies of furnace output with the same or less resistance to flue gas flow with consequent elimination of necessity to use expensive means for increasing stack draft. It is also possible to use these devices embodying the invention at higher temperatures, or, if used at the temperatures of prior devices, to use lower cost metals in the heat exchangers, and to use fewer heat exchange elements. For the above reasons the recuperator units embodying the invention provide exceptional advantages in increasing outputs of older existing furnaces.

While the invention has been discussed in connection with banks of heat exchange elements connected in parallel, recuperator units embodying the invention may be disposed in series, or in parallel series combinations.

It will be appreciated that the invention may be adapted to recuperators and recuperator units of different types and for different purposes from those illustrated, and that modifications other than those indicated above may be made in the embodiments specifically disclosed herein, which are given by way of example only. The essential characteristics of the invention are set forth in the appended claims.

I claim:

1. A heat exchanger recuperator comprising a generally horizontally disposed longitudinally extending chamber having longitudinally extending side walls; means for passing heating gases longitudinally through said chamber; a structure for conducting gases to be heated extending across the top of said chamber and comprising upper and lower compartments extending transversely of said chamber with a lower partition at the bottom of said lower compartment and an intermediate partition separating said upper and lower compartments; and a bank of downwardly extending elongated heat exchange elements of rectangular cross section suspended from said structure with the major axis of the rectangular cross section of each heat exchange element extending generally longitudinally of said chamber, said bank extending transversely of said chamber, each of said heat exchange elements comprising a downwardly extending elongated inner tubular element of rectangular cross section having an opening at its lower end and at its upper end being supported by said intermediate partition in communication with upper compartment, a downwardly extending elongated outer tubular element of rectangular cross section and formed of heat conductive metal surrounding said inner tubular element and defining therebetween a peripheral space, said outer tubular element having a closed lower end and at its upper end being supported by said lower partition in communication with said lower compartment and having its exterior surface of metal and essentially bare of external protuberances providing extended heat transfer surfaces, and spaced heat transfer fins carried by and extending longitudinally of the interior surface of said outer tubular element in said peripheral space with their outer edges in close proximity to the exterior surface of said inner tubular element, said fins being so closely spaced and of such number that the finned interior surface of said outer tubular element provides in said peripheral space a heat transfer area at least twice as great as the heat transfer area provided by the exterior surface of said outer tubular element and prevents appreciable reduction in the thickness of said peripheral space in the event of deformation due to heat of either of said outer and inner tubular elements, each of the outermost heat exchange elements nearest the side walls of said chamber having therein the portion of the peripheral space nearest said chamber side wall of a thickness substantially greater than the thickness of the longer side portions of the peripheral space in any heat exchange element in said bank located between said outermost heat exchange elements.

2. The heat exchanger of claim 1, in which the fins are correspondingly wider in said thicker portions of said peripheral spaces of said outermost heat exchangers than elsewhere in heat exchangers in said bank.

References Cited in the file of this patent

UNITED STATES PATENTS

| | | |
|---|---|---|
| 44,155 | Blake | Sept. 13, 1864 |
| 486,990 | Talmage | Nov. 29, 1892 |
| 813,918 | Schmitz | Feb. 27, 1906 |
| 1,894,270 | Grady | Jan. 17, 1933 |
| 2,473,633 | Brown | June 21, 1949 |
| 2,841,383 | Hazen | July 1, 1958 |

FOREIGN PATENTS

| | | |
|---|---|---|
| 928,633 | France | June 9, 1947 |